United States Patent
Doorandish

(10) Patent No.: US 9,473,919 B2
(45) Date of Patent: Oct. 18, 2016

(54) SYSTEM AND METHOD FOR ANTI TEXTING IN CELL PHONES DURING VEHICLE DRIVING

(71) Applicant: Seyed Mehdi Doorandish, Woodland Hills, CA (US)

(72) Inventor: Seyed Mehdi Doorandish, Woodland Hills, CA (US)

(*) Notice: Subject to any disclaimer, the term of this patent is extended or adjusted under 35 U.S.C. 154(b) by 0 days.

(21) Appl. No.: 14/714,243

(22) Filed: May 15, 2015

(65) Prior Publication Data

US 2015/0256999 A1    Sep. 10, 2015

Related U.S. Application Data

(60) Provisional application No. 61/994,282, filed on May 16, 2014.

(51) Int. Cl.
| | |
|---|---|
| *H04W 4/00* | (2009.01) |
| *H04W 4/22* | (2009.01) |
| *H04W 8/22* | (2009.01) |
| *H04M 1/725* | (2006.01) |

(52) U.S. Cl.
CPC ........... *H04W 4/22* (2013.01); *H04M 1/72577* (2013.01); *H04W 4/008* (2013.01)

(58) Field of Classification Search
CPC . H04M 1/72577; H04W 4/008; H04W 4/72; H04W 4/02; H04W 4/22
USPC ............. 455/41.2, 456.4, 419, 456.3, 238.1, 455/569.1, 569.2, 414.1, 456.1; 701/1, 301, 701/36, 414, 10.1
See application file for complete search history.

(56) References Cited

U.S. PATENT DOCUMENTS

| | | | |
|---|---|---|---|
| 2012/0214472 A1* | 8/2012 | Tadayon | H04B 5/0062 455/418 |
| 2014/0043135 A1* | 2/2014 | Kotecha | G05B 19/0428 340/3.1 |
| 2014/0200799 A1* | 7/2014 | Sugano | B62D 15/027 701/301 |
| 2015/0237195 A1* | 8/2015 | Jones | H04M 1/72577 455/418 |

* cited by examiner

*Primary Examiner* — Inder Mehra
(74) *Attorney, Agent, or Firm* — Barry Choobin; Patent 360

(57) ABSTRACT

The embodiments herein provide a system and method for enabling anti-texting feature in a cell phone when the cell phone is operated by a driver in a dangerous manner such as text messaging or holding the cell phone to the driver's ear while driving a vehicle. The system creates a green zone or life zone around a driver's seat that controls the driver not to participate in distracting activities while driving a vehicle. The system comprises a sensor module, Bluetooth transmitter, and a Bluetooth receiver installed in driver's cell phone. The Bluetooth transmitters are placed at different locations in vehicle and analyzes the driver behavior while driving the vehicle. The sensor in vehicle monitors the driver behavior and transmits appropriate signals. The Bluetooth receiver receives the signals from the transmitter and disables keypad interface of the driver cell phone through an anti-texting application.

15 Claims, 7 Drawing Sheets

SYSTEM AND METHOD FOR ANTI TEXTING IN CELL PHONES DURING VEHICLE DRIVING

CROSS-REFERENCE TO RELATED APPLICATION

The present application claims priority of the U.S. provisional application Ser. No. 61/994,282 filed on May 16, 2014, and that application is incorporated in its entirety at least by reference.

BACKGROUND

1. Technical Field

The embodiments herein are generally related to safety devices for vehicles. The embodiments herein are particularly related to safety devices for controlling driver activity during vehicle driving condition. The embodiments herein are more related to a safety device for preventing communication of any format from a mobile communication device of a driver while driving a vehicle. The embodiments herein are also particularly related a system and a method for preventing road accidents by enabling anti-texting in a cell phone when a driver operates the cell phone during a vehicle driving condition. The embodiments herein also relates to a system and method for creating a green zone or life zone around a driver's seat to controls the driver not to participate in distracting activities while driving a vehicle.

2. Description of the Related Art

In recent years, personal communication devices such as cellular telephones, wireless devices, wireless personal data assistants (PDAs), text messaging devises and wireless pocket PC's have immense public utility and improve communication in social and commercial interactions. As a result, the usage of these devices has increased rapidly. With the increase in usage, new problems associated with these devices have arisen. The use of mobile phones while driving is common, but widely considered dangerous. Because, distracted driving is a serious threat to road safety.

There are different types of driver distractions, but the use of cell phones while driving is of primary concern. Using cell phones while driving a vehicle causes drivers to take their eyes off the road and make hands off on the steering wheel. Due to this, the driving behavior is impacted and the chance of occurring an accident increases.

According to recent statistics, around 20 percent of fatal road accidents with trucks and other heavy vehicles globally involve drivers who operate a cell phone at the time of driving. Similarly, a recent survey of smartphone owners indicated that nearly 20 percent browse the web while driving, and data indicate that texting while driving is even more dangerous than calling. This clearly shows that both in-hand and hands-free mobile phone use increase the chances of an accident occurring.

A number of safety systems have been proposed to deter or prevent drivers from using their cell phones while driving. In some systems, specific software applications are installed on the driver's mobile device to ensure safe driving. The problem with such systems is that the driver simply removes or uninstalls the application when the driver is determined to make use of the phone while driving. In some other systems, an embedded GPS or motion sensors such as accelerometers in mobile phones are used to detect movement and vehicle travel. GPS location data or other types of motion data are extracted from embedded GPS receiver or motion sensors in a cell phone to estimate the motion state of a cell phone user. When the prevailing moving speed of a cell phone exceeds a predetermined threshold, the communication functions are typically disabled. This kind of approach has difficulties and limitations. For example, after waking up from the standby mode, a GPS receiver needs an extended time period (10-30 seconds) to fetch the first few GPS location samples to calculate reliable space mean speed. Thus, the system fails to accurately predict when the user is traveling at a high rate of speed.

Hence there is a need for a system and method for effectively disabling personal communication devices such as a cell phone while a driver operates the device in a dangerous manner during a driving of a vehicle. Further, there is a need for a system and method for creating a green zone or safe life zone around a driver's seat that controls the driver not to participate in distracting activities while driving a vehicle. There is also a need for system and method for disabling multiple communication devices that are brought near to a driver seat while the driver operates a vehicle.

The above-mentioned shortcomings, disadvantages and problems are addressed herein and which will be understood by reading and studying the following specification.

OBJECT OF THE EMBODIMENTS

The primary object of the embodiments herein is to provide a system and method for enabling an anti-texting feature in a cell phone when the cell phone is operated by a driver in a dangerous manner such as text messaging or holding the cell phone to the driver's ear while driving a vehicle.

Another object of the embodiments herein is to provide a system and method for disabling a keypad interface in a cell phone when a vehicle driver tries to operate the cell phone in a dangerous manner while driving the vehicle.

Yet another object of the embodiments herein is to provide a system and method for creating a green zone or life zone around a driver's seat to control the driver not to participate in distracting activities while driving a vehicle.

Yet another object of the embodiments herein is to provide a system and method for disabling multiple communication devices that are brought near to a driver seat while the driver drivers a vehicle.

Yet another object of the embodiments herein is to provide a life box or driver mode box that gets updated depending on drivers' behavior and yearly accident statistics and further implements the updated rules in real time road scenarios.

Yet another object of the embodiments herein is to provide a system and method for detecting facial expressions of a driver and sending physical alarms to the driver based on the detected facial expressions.

Yet another object of the embodiments herein is to provide a system and method to disable the keypad of various applications in multiple cell phones by using specific bandwidths from the Bluetooth transmitter.

Yet another object of the embodiments herein is to provide a system and method to enable a driver mode in a cell phone when the cell phone is brought to the driver's seat.

Yet another object of the embodiments herein is to provide a system and method to disable texting, messaging or initiating calls from a mobile communication device of a driver while allowing texting, messaging and making calls from the mobile communication device of the passengers in a vehicle.

These and other objects and advantages of the embodiments herein will become readily apparent from the following detailed description taken in conjunction with the accompanying drawings.

SUMMARY

The objects and advantages of the embodiments herein will become readily apparent from the following detailed description taken in conjunction with the accompanying drawings.

The following description provides a simplified summary of the embodiments herein to provide a basic understanding of the aspects of the embodiments herein. This summary is not an extensive overview of the embodiments herein. It is not intended to identify key/critical elements of the embodiments herein or to delineate the scope of the embodiments herein. Its sole purpose is to present some concept of the embodiments herein in a simplified form as a prelude to the more detailed description that is presented later.

According to an embodiment herein, a system is provided for preventing anti-texting and making calls by a driver of vehicle during a vehicle driving condition. The system comprises a sensor module for detecting a vehicle running condition; a Bluetooth transmitter mounted on a windshield or dash board of a vehicle for creating a safe life zone or green zone around a driver seat; and a Bluetooth receiver. The Bluetooth transmitter sends a disable signal to the Bluetooth receiver to prevent texting operation or making calls, when the driver of the vehicle operates a mobile communication device for texting or messaging or initiating a call while driving a vehicle based on a sensor output.

According to an embodiment herein, the sensor detects a driving condition of the vehicle and judges that the driver of a vehicle is engaged in texting a message or establishing call using a mobile communication device while driving the vehicle.

According to an embodiment herein, the Bluetooth receiver is placed inside a mobile communication device of the driver.

According to an embodiment herein, the Bluetooth receiver is placed outside the mobile communication device of the driver.

According to an embodiment herein, the Bluetooth receiver transmits a disable signal to the mobile communication device of the driver to disable a keyboard interface to disable a texting operation.

According to an embodiment herein, the Bluetooth transmitter is configured to send the disable signal to the Bluetooth receiver to disable the texting operation or making calls, when the mobile communication device of the driver is operated by the driver of the vehicle or when the mobile communication device of the driver is held close to ear of the driver while driving a vehicle.

According to an embodiment herein, the Bluetooth transmitter is configured to disable testing operation or a call initiating operation in the mobile communication of the driver, while allowing an operation of the mobile communication device by passengers in the vehicle.

According to an embodiment herein, the Bluetooth transmitter is configured to disable testing operation or a call initiating operation in the mobile communication used by the driver, even when the driver uses the mobile communication device of the passengers for texting operation or making calls.

According to an embodiment herein, the sensor module comprises an ignition detection module configured to detect a drive condition of the vehicle by using motion sensors and speed sensors or key position sensors; an alcohol tester module configured to analyze a breathing of the driver to detect a drunken condition of the driver; a face detection module configured to detects a facial expression of the driver by using an imaging sensor; and a gesture recognition module configured to detect hand/head gestures of the driver to send the analyzed data to a processing module to output a disable signal.

According to an embodiment herein, a method is provided for preventing anti-texting and making calls by a driver of a vehicle during a vehicle driving condition. The method comprising steps of detecting a driver condition and vehicle condition using a sensor module; activating a Bluetooth transmitter positioned on a vehicle to output a disable signal based on output of the sensor module; and receiving the disable signal from the Bluetooth transmitter by a Bluetooth receiver to disable a texting operation or a call initiating operation or call communication operation in a mobile communication device of a driver. The Bluetooth transmitter sends a disable signal to the Bluetooth receiver to prevent texting operation or making calls, when the driver of the vehicle operates a mobile communication device for texting or messaging or initiating a call while driving a vehicle based on a sensor output.

According to an embodiment herein, the sensor detects a driving condition of the vehicle and judges that the driver of a vehicle is engaged in texting a message or establishing call using a mobile communication device while driving the vehicle.

According to an embodiment herein, the Bluetooth receiver is placed inside a mobile communication device of the driver.

According to an embodiment herein, the Bluetooth receiver is placed outside the mobile communication device of the driver.

According to an embodiment herein, the Bluetooth receiver transmits a disable signal to the mobile communication device of the driver to disable a keyboard interface to disable a texting operation.

According to an embodiment herein, the Bluetooth transmitter is configured to send the disable signal to the Bluetooth receiver to disable the texting operation or making calls, when the mobile communication device of the driver is operated by the driver of the vehicle or when the mobile communication device of the driver is held close to ear of the driver while driving a vehicle.

According to an embodiment herein, the Bluetooth transmitter is configured to disable texting operation or a call initiating operation in the mobile communication of the driver, while allowing an operation of the mobile communication device by passengers in the vehicle.

According to an embodiment herein, the Bluetooth transmitter is configured to disable testing operation or a call initiating operation in the mobile communication used by the driver, even when the driver uses the mobile communication device of the passengers for texting operation or making calls.

According to an embodiment herein, the method further comprises
detecting a drive condition of the vehicle by using motion sensors and speed sensors or key position sensors in an ignition detection module; analyzing a breathing of the driver to detect a drunken condition of the driver with an alcohol tester module; detecting a facial expression of the driver by using an imaging sensor face detection module; and detecting and analyzing hand/head gestures of the driver with a gesture recognition module to send an analyzed data to a processing module to output a disable signal.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
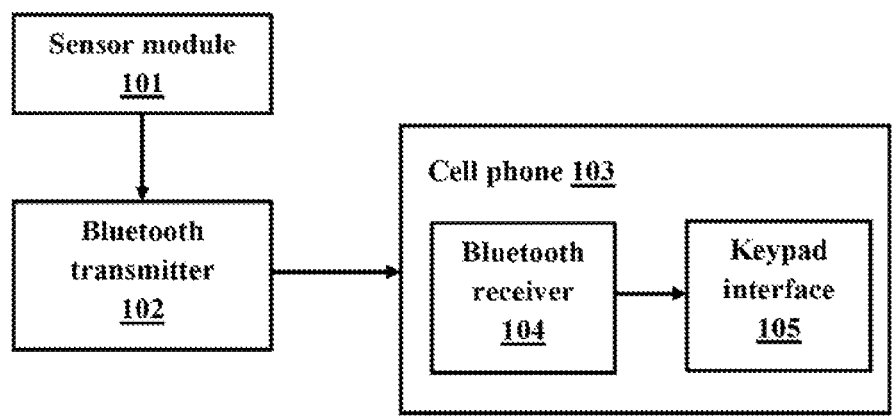
FIG. 1 illustrates a functional block diagram of an anti-texting system in a cell phone with an internal Bluetooth receiver, according to an embodiment herein.

Although the specific features of the embodiments herein are shown in some drawings and not in others. This is done for convenience only as each feature may be combined with any or all of the other features in accordance with the embodiment herein.

DETAILED DESCRIPTION OF THE EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

According to an embodiment herein, a system is provided for preventing anti-texting and making calls by a driver of vehicle during a vehicle driving condition. The system comprises a sensor module for detecting a vehicle running condition; a Bluetooth transmitter mounted on a windshield or dash board of a vehicle for creating a safe life zone or green zone around a driver seat; and a Bluetooth receiver. The Bluetooth transmitter sends a disable signal to the Bluetooth receiver to prevent texting operation or making calls, when the driver of the vehicle operates a mobile communication device for texting or messaging or initiating a call while driving a vehicle based on a sensor output.

According to an embodiment herein, the sensor detects a driving condition of the vehicle and judges that the driver of a vehicle is engaged in texting a message or establishing call using a mobile communication device while driving the vehicle.

According to an embodiment herein, the Bluetooth receiver is placed inside a mobile communication device of the driver.

According to an embodiment herein, the Bluetooth receiver is placed outside the mobile communication device of the driver.

According to an embodiment herein, the Bluetooth receiver transmits a disable signal to the mobile communication device of the driver to disable a keyboard interface to disable a texting operation.

According to an embodiment herein, the Bluetooth transmitter is configured to send the disable signal to the Bluetooth receiver to disable the texting operation or making calls, when the mobile communication device of the driver is operated by the driver of the vehicle or when the mobile communication device of the driver is held close to ear of the driver while driving a vehicle.

According to an embodiment herein, the Bluetooth transmitter is configured to disable testing operation or a call initiating operation in the mobile communication of the driver, while allowing an operation of the mobile communication device by passengers in the vehicle.

According to an embodiment herein, the Bluetooth transmitter is configured to disable testing operation or a call initiating operation in the mobile communication used by the driver, even when the driver uses the mobile communication device of the passengers for texting operation or making calls.

According to an embodiment herein, the sensor module comprises an ignition detection module configured to detect a drive condition of the vehicle by using motion sensors and speed sensors or key position sensors; an alcohol tester module configured to analyze a breathing of the driver to detect a drunken condition of the driver; a face detection module configured to detects a facial expression of the driver by using an imaging sensor; and a gesture recognition module configured to detect hand/head gestures of the driver to send the analyzed data to a processing module to output a disable signal.

According to an embodiment herein, a method is provided for preventing anti-texting and making calls by a driver of a vehicle during a vehicle driving condition. The method comprising steps of detecting a driver condition and vehicle condition using a sensor module; activating a Bluetooth transmitter positioned on a vehicle to output a disable signal based on output of the sensor module; and receiving the disable signal from the Bluetooth transmitter by a Bluetooth receiver to disable a texting operation or a call initiating operation or call communication operation in a mobile communication device of a driver. The Bluetooth transmitter sends a disable signal to the Bluetooth receiver to prevent texting operation or making calls, when the driver of the vehicle operates a mobile communication device for texting or messaging or initiating a call while driving a vehicle based on a sensor output.

According to an embodiment herein, the sensor detects a driving condition of the vehicle and judges that the driver of a vehicle is engaged in texting a message or establishing call using a mobile communication device while driving the vehicle.

According to an embodiment herein, the Bluetooth receiver is placed inside a mobile communication device of the driver.

According to an embodiment herein, the Bluetooth receiver is placed outside the mobile communication device of the driver.

According to an embodiment herein, the Bluetooth receiver transmits a disable signal to the mobile communication device of the driver to disable a keyboard interface to disable a texting operation.

According to an embodiment herein, the Bluetooth transmitter is configured to send the disable signal to the Bluetooth receiver to disable the texting operation or making calls, when the mobile communication device of the driver is operated by the driver of the vehicle or when the mobile communication device of the driver is held close to ear of the driver while driving a vehicle.

According to an embodiment herein, the Bluetooth transmitter is configured to disable testing operation or a call initiating operation in the mobile communication of the driver, while allowing an operation of the mobile communication device by passengers in the vehicle.

According to an embodiment herein, the Bluetooth transmitter is configured to disable testing operation or a call initiating operation in the mobile communication used by the driver, even when the driver uses the mobile communication device of the passengers for texting operation or making calls.

According to an embodiment herein, the method further comprises detecting a drive condition of the vehicle by using motion sensors and speed sensors or key position sensors in an ignition detection module; analyzing a breathing of the driver to detect a drunken condition of the driver with an alcohol tester module; detecting a facial expression of the driver by using an imaging sensor face detection module; and detecting and analyzing hand/head gestures of the driver with a gesture recognition module to send an analyzed data to a processing module to output a disable signal.

The various embodiments herein provide a system and method for enabling an anti-texting feature in a cell phone when the cell phone is operated by a driver in a dangerous manner such as text messaging or holding the cell phone to the driver's ear while driving a vehicle. The anti-texting system comprises a sensor module, a Bluetooth transmitter, and a cell phone. The cell phone further comprises a Bluetooth receiver and a keypad interface. A plurality of Bluetooth transmitters are placed at different locations in a car for forming a triangular safe zone or safe life zone around a driver seat. The sensor module is configured to detect various parameters required for enabling anti-texting in the cell phone of the driver.

According to one embodiment herein, the sensor module comprises an ignition detection module, face detection sensor, gesture recognition sensor, alcohol detection module, proximity sensor, accelerometer and a personnel movement sensor. The sensor module optionally includes other sensors such as a digital compass (magnetometer) and/or a tilt sensor or accelerometer, ambient light sensor, and gyroscope. For example, when the driver looks down at the cell phone rather than on the road, or the driver keeps or holds the cell phone adjacent to his ear during a driving of the vehicle, the sensor module detects the behavior and transmits appropriate signals through the Bluetooth transmitter.

According to an embodiment herein, the Bluetooth transmitter is a short range wireless Bluetooth transmitter that is configured to receive control signals and other facial expression or gesture related signals from the sensor module. Based on the signals received, the transmitter transmits data to the Bluetooth receiver through a communication module.

According to an embodiment herein, the Bluetooth receiver is placed inside the cell phone of the driver. According to an embodiment herein, the Bluetooth receiver is in the form of an actual hardware chip which is usually an original equipment manufacturer product. The Bluetooth receiver receives the data transmitted by the Bluetooth transmitter and further sends the data to the cell phone processor. The processor disables the keypad interface through an anti-texting application installed in the cell phone.

According to one embodiment herein, the Bluetooth transmitter is a Bluetooth device of class 3. The power of this type of Bluetooth devices is 1 mW and the radiation range extends up to 1 meter. The class 3 Bluetooth devices are of low power and ensures the safety of the driver while implementing anti-texting features in cell phone of the driver.

According to an embodiment herein, the Bluetooth transmitter is embedded in a location adjacent to the driver's seat. According to an embodiment herein, the Bluetooth transmitter is embedded in the dashboard adjacent to the windshield so that the transmitter is not visible and a removal of the transmitter is prevented. The Bluetooth signals transmitted by the Bluetooth transmitter has a given or pre-set radius or operating range which is designed to cover the area where a driver is seated while operating the vehicle. The signals are not extended to an area which covers the location where passengers (other than driver) are seated.

According to an embodiment herein, a plurality of Bluetooth transmitters are placed at different locations in a car forming a triangular zone around a driver seat. The range of transmission of the Bluetooth transmitter is designed to cover the location where the driver is seated. The range of transmission varies between 2 feet and 3½ feet depending on type the vehicle.

According to one embodiment herein, the anti-texting application is installed on the cell phone through an OS update or the application is downloaded by the driver from online app store.

According to one embodiment herein, the Bluetooth receiver in the cell phone is simultaneously connected to other paired Bluetooth devices such as hands free Bluetooth set or car Bluetooth while interacting with the anti-texting system.

According to one embodiment herein, the anti-texting system uses beacon technology or any other suitable technology for more accurately detecting and transmitting sensor data to the anti-texting application installed in cell phone of the driver.

According to an embodiment herein, the sensor module detects and disable multiple communication devices that are brought near to a driver seat while the driver drivers a vehicle or when the driver operates a passenger's cell phone while driving the vehicle.

According to one embodiment herein, a driver mode is activated in the cell phone of the driver automatically, when the cell phone is brought into the green zone or life zone created by the Bluetooth transmitters.

According to an embodiment herein, the Bluetooth transmitters are original equipment installed in a car by a specialist or by car dealer while manufacturing the car. The Bluetooth transmitters are combined with the anti-texting application and cannot be disabled by the vehicle driver.

According to an embodiment herein, the anti-texting system detects the facial expressions of the driver and sends alarms to the driver based on the detected facial expressions. According to an embodiment herein, the face recognition module recognizes the expressions and triggers an alarm in the vehicle, when the driver feels drowsy.

According to one embodiment herein, the anti-texting system extends the range of green zone or life zone when the driver of the vehicle skips the green zone or life zone while operating the cell phone in the driver seat.

According to one embodiment herein, the anti-texting application provides a special button to access the texting feature in the cell phone during emergency condition or SOS conditions or pre-set times in a month. This helps the driver to get assistance during emergency situations. According to an embodiment herein, the anti-texting application allows the drivers to access the texting or call feature while driving the vehicle for 10 times in a month.

According to an embodiment herein, the sensor module is configured to disable the keypad of various applications in multiple cell phones when several cell phones are brought near to the driver seat by using specific bandwidths for each cell phone. According to an embodiment herein, the Bluetooth transmitter detects the cell phones and disables the keypad interface accordingly, when a driver talks on multiple separate cell phones or text messaging on multiple separate cell phones in a dangerous manner.

According to one embodiment herein, the anti-texting application analyses the behaviour characteristics of the driver and further creates a profile for the driver in a driver mode box or life box. The driver mode box is configured to get updates from anti-texting server and implements the updated rules in real time road scenarios. A new rule is updated in the anti-texting server to disable the keypad interface of a cell phone, when the driver or a person in the driver seat tries to browse or surf the internet while driving the vehicle. Further, anti-texting application in all cell phones gets an update of disabling the keypad interface when the driver tries to browse or surf the internet while driving the vehicle.

According to an embodiments herein, a method is provided for enabling an anti-texting feature in a cell phone when the cell phone is operated by a driver and vehicle is driven in a dangerous manner. The method comprises the steps of determining ignition status of the vehicle by using motion and speed sensors or key position sensors in a vehicle. When the ignition state of the vehicle is detected to be in ON condition, a face detection module, a gesture recognition module and an alcohol tester modules are activated to start monitoring the driver of the vehicle for a preset conditions to occur. When the pre set conditions are met, the Bluetooth transmitter sends appropriate signals to the Bluetooth receiver, which is an inbuilt module in driver's cell phone.

According to one embodiment herein, For example, the Bluetooth transmitter transmits the Bluetooth signal to the cell phone when the cell phone is placed or held adjacent to an ear of the driver. After forming a green zone or life zone, the face detection module detects facial expressions of the driver by using an imaging sensor. The gesture recognition module detects various hand/head gestures of the driver and sends the analyzed data to the processing module.

The Bluetooth receiver receives the signals and forwards them to an anti-texting application installed in the driver's cell phone. Further, the anti-texting application sends appropriate signals to the processor of the cell phone and disable the keypad driver/interface of the cell phone. This prevents the driver to use the cell phone for texting or making calls while driving the vehicle in a dangerous manner.

FIG. 1 illustrates a functional block diagram of an anti-texting system in a cell phone with an internal Bluetooth receiver, according to an embodiment herein. With respect to FIG. 1, the anti-texting system comprises sensor module 101, Bluetooth transmitter 102, and cell phone 103. The cell phone 103 further comprises Bluetooth receiver 104 and keypad interface 105. A plurality of Bluetooth transmitters 102 are placed at different locations in a car forming a triangular zone around a driver sea to provide a green zone of safe life zone. The sensor module 101 is configured to detect various parameters required for enabling anti-texting in the cell phone of the driver. According to one embodiment herein, the sensor module 101 contains an ignition detection module, face detection sensor, gesture recognition sensor, alcohol detection module, and proximity sensor. The sensor module 101 optionally includes other sensors such as a digital compass (magnetometer) and/or a tilt sensor or accelerometer, ambient light sensor, and gyroscope. According to an embodiment herein, the sensor module 101 detects the behavior and transmits appropriate signals through the Bluetooth transmitter 102, when the driver looks down at the cell phone rather than on the road, or the driver has the cell phone adjacent his ear and driving the vehicle with one hand.

The Bluetooth transmitter 102 is a short range wireless Bluetooth transmitter that is configured to receive control signals and other facial expression or gesture related signals from the sensor module 101. Based on the signals received, the transmitter 102 transmits data to the Bluetooth receiver 104 through a communication module. According to one embodiment herein, the Bluetooth transmitter 102 is a Bluetooth device of class 3. The power of this type of Bluetooth devices is 1 mW and the radiation range extends up to 1 meter. The class 3 Bluetooth devices are of low power and ensures the safety of the driver while implementing anti-texting features in cell phone.

According to an embodiment herein, the Bluetooth transmitter 102 is embedded in a location adjacent to the driver seat. According to an embodiment herein, the Bluetooth transmitter 102 is embedded in the dashboard adjacent to the windshield so that the Bluetooth transmitter is not visible and could not be removed.

The Bluetooth signals transmitted by the Bluetooth transmitter 102 has a preset radius or operating range to cover the area where a driver is seated while operating the vehicle. The signals are not extended to an area where passengers (other than driver) are seated.

According to an embodiment herein, a plurality of Bluetooth transmitters 102 are placed at different locations in a car to form a triangular zone around a driver seat. The range of transmission of the Bluetooth transmitter is designed to cover the location where the driver is seated. The range of transmission varies between 2 feet and 3½ feet depending on type the vehicle.

The Bluetooth receiver 104 is placed inside the cell phone 103 of the driver. According to an embodiment herein, the Bluetooth receiver 104 is in the form of an actual hardware chip which is usually an original equipment manufacturer product. The Bluetooth receiver 104 receives the data transmitted by the Bluetooth transmitter 102 and further sends the data to the cell phone processor. The processor disables the keypad interface 105 through an anti-texting application installed in the cell phone 103. According to one embodiment herein, the anti-texting application is installed on the cell phone 103 through an OS update or the application is downloaded by the driver from online app store.

According to one embodiment herein, the Bluetooth receiver 104 in the cell phone is simultaneously connected to other paired Bluetooth devices such as hands free Bluetooth set or car Bluetooth while interacting with the anti-texting system.

According to one embodiment herein, the anti-texting system uses beacon technology or any other suitable technology for more accurately detecting and transmitting sensor data to the anti-texting application installed in cell phone of the driver.

According to an embodiment herein, the sensor module 101 detects and disable multiple communication devices that are brought near to a driver seat during a vehicle driving condition. According to an embodiment herein, the system disables the cell phone when the driver operates a passenger's cell phone while driving the vehicle.

According to one embodiment herein, a driver mode is activated in the cell phone 103 of the driver automatically when the cell phone 103 is brought into the green zone or life zone created by the Bluetooth transmitters 102.

According to an embodiment herein, the Bluetooth transmitters 102 are original equipment installed in a car by a specialist or by car dealer while manufacturing the car. The Bluetooth transmitters are combined with the anti-texting application and cannot be disabled by the vehicle driver.

According to an embodiment herein, the anti-texting system detects the facial expressions of the driver and sends physical alarms to the driver based on the detected facial expressions. According to an embodiment herein, the face recognition module recognizes the expressions and triggers an alarm in the vehicle when the driver feels drowsy.

According to one embodiment herein, the anti-texting system extends the range of green zone or life zone when the driver of the vehicle skips the green zone or life zone while operating the cell phone in the driver seat.

According to one embodiment herein, the anti-texting application provides special button to access the texting feature in the cell phone while driving the vehicle for a pre-set count in a month or during an emergency condition. This helps the driver to get assistance during emergency situations. According to an embodiment herein, the anti-texting application allows the drivers to access the texting or call feature while driving the vehicle for 10 times in a month.

According to an embodiment herein, the sensor module 101 is configured to disable the keypad of various applications in multiple cell phones that are bought near to the driver seat by using specific bandwidths for each cell phone. According to an embodiment herein, the Bluetooth transmitter detects the cell phones and disables the keypad interface accordingly when a driver talks on multiple separate cell phones or text messaging on multiple separate cell phones and drives a vehicle in a dangerous manner.

According to one embodiment herein, the anti-texting application analyses the behaviour characteristics or patterns of the driver and further creates a profile for the driver in a driver mode box. The driver mode box is configured to get updates from anti-texting server and implements the updated rules in real time road scenarios. According to an embodiment herein, a new rule is updated in the anti-texting server to disable the keypad interface of a cell phone when the driver or a person in the driver seat tries to browse or surf the internet while driving the vehicle. Further, anti-texting application in all cell phones gets an update of disabling the keypad interface when the driver tries to browse or surf the internet while driving the vehicle.

Figure 2:
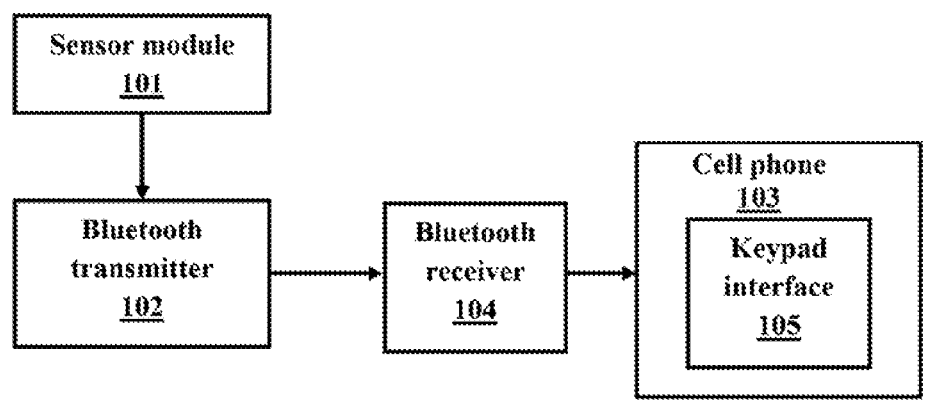
FIG. 2 illustrates a functional block diagram of an anti-texting system in a cell phone with an external Bluetooth receiver, according to an embodiment herein.

FIG. 2 illustrates a functional block diagram of an anti-texting system in a cell phone with an external Bluetooth receiver, according to an embodiment herein. With respect to FIG. 2, the Bluetooth 104 receiver is placed externally to the cell phone 103 of the driver. For example, the Bluetooth receiver is a downloaded application which is embedded in a cell phone in a manner that the vehicle driver is prevented from uninstalling or removing the application. The Bluetooth receiver 104 receives the sensor data transmitted by the Bluetooth transmitter 102 and further forwards the data to the processor for disabling keypad interface 105 of the cell phone 103.

Figure 3:
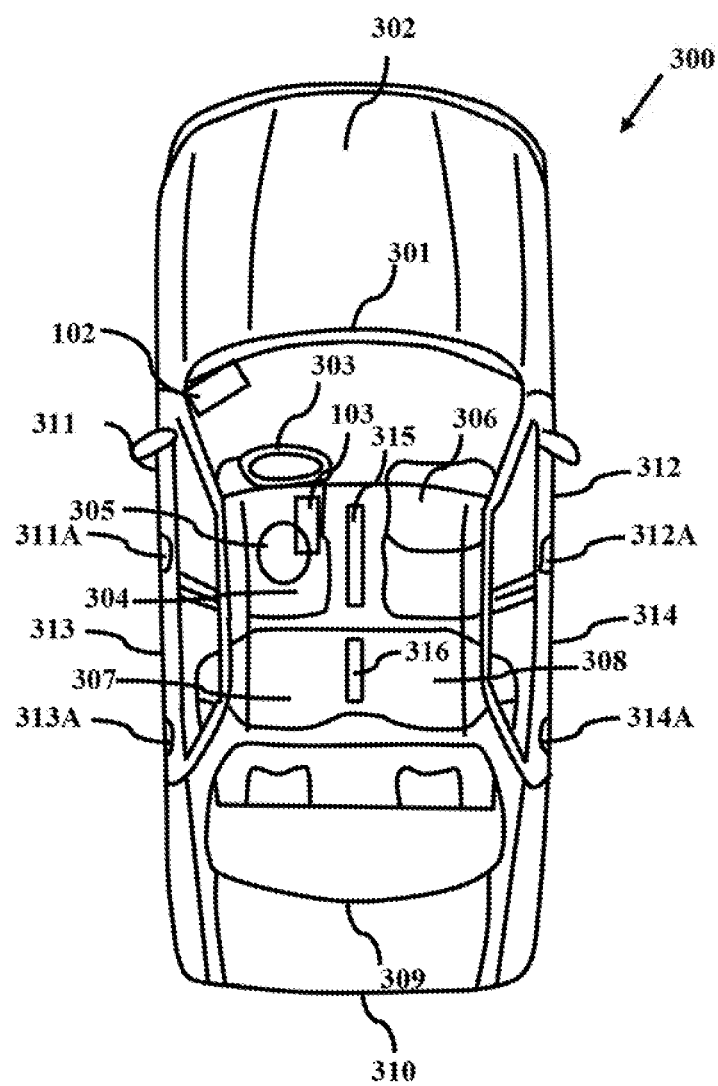
FIG. 3 illustrates a top plane view of a car installed with an anti-texting system, according to an embodiment herein.

FIG. 3 illustrates a top plane view of a car installed with an anti-texting system, according to an embodiment herein. With reference to FIG. 3, the vehicle 300 has a front windshield 301 and a hood 302. In the top view, the roof of the vehicle is removed to show the interior components of the car and the anti-texting system. The inner view includes steering wheel 303, driver's seat 304 with a driver 305 seated in the seat and passenger seats 306, 307 and 308 along with a rear windshield 309 and the trunk 310. The doors which are illustrated for the sake of completeness are not part of the embodiments herein that include door 311 on the driver's side and door handle 311A, door 312 on the front passenger side and door handle 312A, first rear door 313 on the side behind the driver with door handle 313A and rear door 314 on the side behind the passenger with door handle 314A. The seats are separated by central consoles 700 and 800. The Bluetooth transmitter 100 is placed at the windshield of the car. The Bluetooth transmitter 100 is embedded in a location adjacent to where the driver is seated such as in the dashboard adjacent to the windshield of a vehicle 300 so that the transmitter is not visible and cannot be removed. The cell phone 103 is retained by the driver 305 while seated in the driver seat 304.

Figure 4:
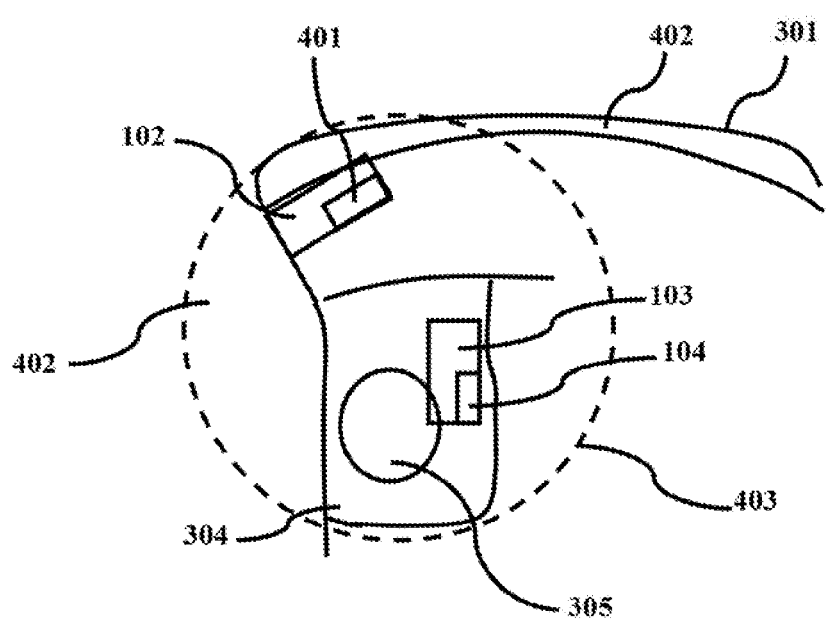
FIG. 4 illustrates an enlarged view of an anti-texting system installed in a car indicating a Bluetooth transmitter and operating range of Bluetooth transmitter around a driver seat for providing a life-zone or green zone, according to an embodiment herein.

FIG. 4 illustrates an enlarged view of an anti-texting system installed in a car indicating a Bluetooth transmitter and operating range of the transmitter around a driver seat, according to an embodiment herein. With respect to FIG. 4, the Bluetooth transmitter 102 is embedded into the windshield 301 and the dashboard 402. According to an embodiment herein, the Bluetooth transmitter 102 is embedded in such a way that the transmitter is concealed and the removal of transmitter is prevented. The Bluetooth transmitter 102 comprises a transmitting chip 401 to transmit a Bluetooth signal for a given radius 403 illustrated in dotted lines in FIG. 4. The radius covers the areas where the driver 305 is seated and where the driver 305 is likely to retain the cell phone 103. According to one embodiment herein, the radius does not extend to the passenger seats in the car. The driver's seat 304 is illustrated with the driver 305 seated in the seat and holding the cell phone 103 in hand. The Bluetooth receiver 104 is embedded in the cell phone 103.

According to an embodiment herein, the Bluetooth receiver 104 is an original equipment manufacturer chip embedded in the cell phone 103 or alternatively, a downloadable application, which is downloaded into the cell phone 103. The installation is done in such a manner that the application cannot be erased by the driver 305.

Figure 5:
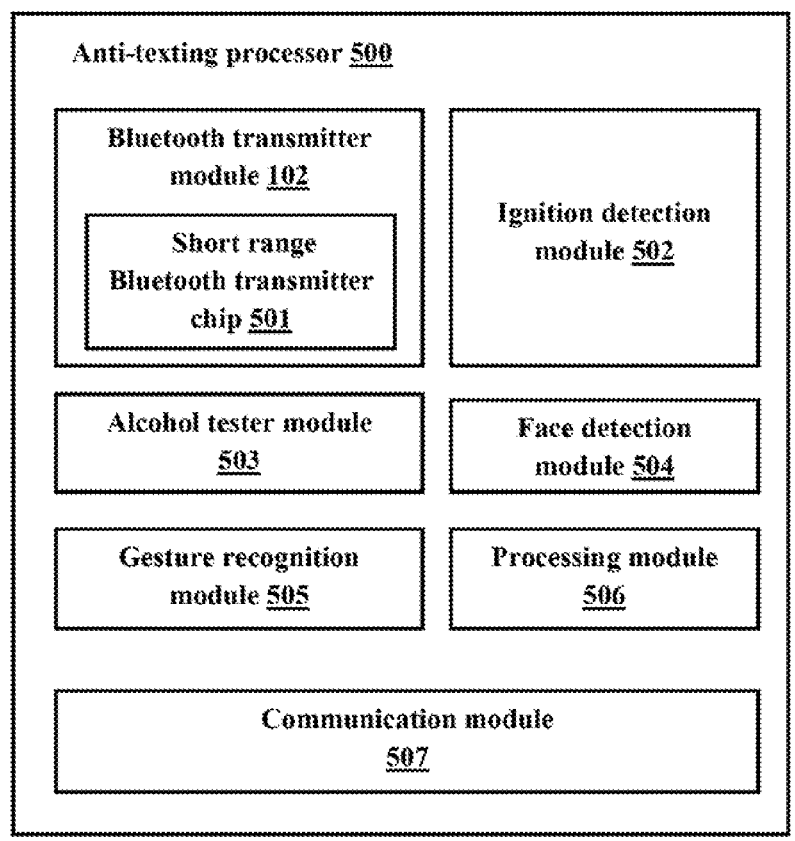
FIG. 5 illustrates a block diagram representing various modules of an anti-texting processor system provided in an anti-texting system in a vehicle, according to an embodiment herein.

FIG. 5 illustrates a block diagram of an anti-texting processor, according to an embodiment herein. With respect to FIG. 5, the anti-texting processor 500 comprises Bluetooth transmitter 102, ignition detection module 502, alcohol tester 503, face detection module 504, gesture recognition module 505, processing module 506, and communication module 507. The Bluetooth transmitter 102 further comprises a short range Bluetooth transmitter chip 501.

The Bluetooth transmitter 102 belongs to Bluetooth devices of class 3. The power of this type of Bluetooth devices is 1 mW and the radiation range extends up to 1 meter. The Bluetooth transmitter chip 501 is configured to receive ignition control signals and face expression or gesture related signals from various sensors present in the anti-texting system.

The Ignition detection module 502 is configured to determine the vehicle ignition state using suitable sensors that are added to the vehicle after the manufacture of the vehicle. According to an embodiment herein, the ignition detection module 502 comprises a motion sensor and a speed sensor to detect whether the vehicle is in rest position or in moving condition. Further, the ignition detection module 502 periodically checks the ignition state and enables the processing module 506 to form a green zone or life zone around the driver seat. according to an embodiment herein, a key position sensor is also configured to detect an ignition status.

The alcohol tester module 503 in the Bluetooth transmitter 102 is configured to calculate a percentage of blood alcohol concentration (BAC) from breathe samples of the driver using a breathe analyser. The alcohol tester module 503 periodically tests the driver of the vehicle and determine whether the driver consumed alcohol while driving the vehicle.

The face detection module 504 is configured to detect facial expressions of the driver while the ignition state of the vehicle is ON condition. According to an embodiment herein, the face detection module 504 judges whether the driver is engaged in a call over a cell phone by bending his head sideway or feel drowsy and so on. According to an embodiment herein, the face detection module 504 includes an imaging sensor for capturing an image of the driver face and sends the images to the processor 506. The proceeding module 206 contains suitable pattern classification algorithms to detect the facial expression of the driver. Based on the results, the processing module 506 detects the status of the driver and sends appropriate signals to Bluetooth receiver through the communication module 507.

According to an embodiment herein, the face recognition module 504 is configured to detect the facial expressions of the driver and sends physical alarms to the driver based on the detected facial expressions. According to an embodiment herein, the expressions and triggers an alarm in the vehicle, when the driver feels drowsy the face recognition module recognizes.

The gesture recognition module 505 is configured to detect various hand/head gestures of the driver. According to an embodiment herein, the gesture recognition module 505 includes an imaging sensor for capturing the images of the driver and determine whether the driver uses a cell phone for text messaging or holds the cell phone to the driver's ear while driving a vehicle in a dangerous manner and so on. Further, the gesture recognition module 505 sends the analyzed data to the processing module 506. The processing module 505 is configured to process the data and transmits appropriate signals to the Bluetooth receiver through the communication module 507.

Figure 6:
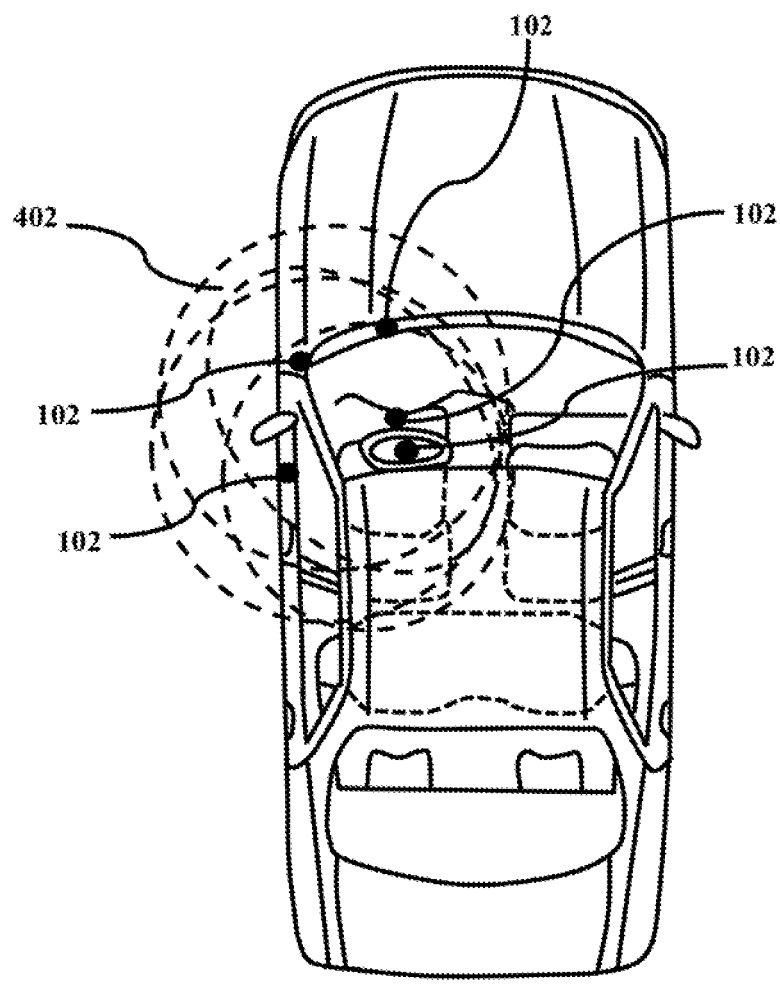
FIG. 6 illustrates a top plane view of a car installed with an anti-texting system installed indicating an installation location of the Bluetooth transmitters and operating ranges of respective Bluetooth transmitters in forming a green zone or life zone around the driver seat, according to an embodiment herein.

FIG. 6 illustrates a top plane view of a car installed with an anti-texting system indicating Bluetooth transmitters and the respective operating ranges of the transmitters in forming a green zone or life zone around the driver seat, according to an embodiment herein. The Bluetooth transmitters 102 are arranged in such a way that a triangular green zone or life zone 402 is formed around the driver seat. According to an embodiment herein, the range of transmission of the Bluetooth transmitter is designed to cover the location where the driver is seated. The range of transmission varies between 2 feet and 3½ feet depending on type the vehicle. As a result, the other passengers around the driver are not covered under this zone and are allowed to use cell phones in a normal way.

Figure 7:
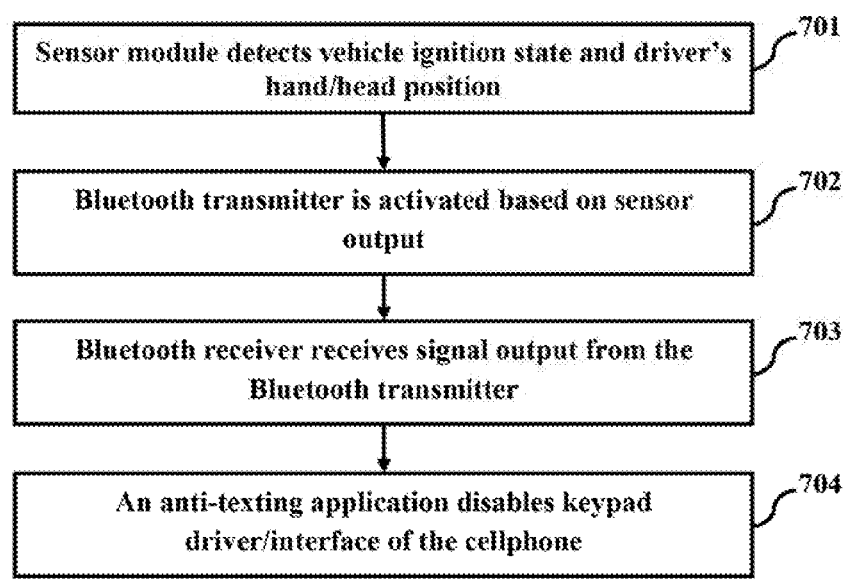
FIG. 7 illustrates a flow chart explaining a method for disabling a keypad of a cell phone in the anti-texting system installed in a vehicle during a vehicle driving condition, according to an embodiment herein.

FIG. 7 illustrates a flow chart explaining a method for enabling an anti-texting feature in a cell phone when the cell phone is operated by a driver for text messaging or held near to the driver's ear while driving a vehicle in a dangerous manner, according to an embodiment herein. Initially, an ignition detection module determines ignition status of the vehicle by using motion and speed sensors or key position sensors. When the ignition state of the vehicle is detected to be in ON condition, the face detection module, gesture recognition module, alcohol tester modules are activated to start monitoring the driver of the vehicle for preset conditions (701) to occur. When the pre-set conditions are met, the Bluetooth transmitter sends appropriate signals to the Bluetooth receiver, which is an inbuilt module in driver's cell phone (702).

According to an embodiment herein, the Bluetooth transmitter transmits the Bluetooth signal to the cell phone when the cell phone is placed adjacent to an ear of the driver. After forming a green zone or life zone, the face detection module detects facial expressions of the driver by using an imaging sensor. The gesture recognition module detects various hand/head gestures of the driver and sends the analyzed data to the processing module.

The Bluetooth receiver receives the signals and forwards them to an anti-texting application installed in the driver's cell phone (703). Further, the anti-texting application sends appropriate signals to the processor of the cell phone and disables the keypad driver/interface of the cell phone (704). This prevents the driver to use the cell phone while driving the vehicle in a dangerous manner.

According to an embodiment herein, the anti-texting application detects and disables multiple communication devices that are brought near to a driver seat while the driver drivers a vehicle. According to an embodiment herein, the anti-texting application detects and disables the communication devices of passengers, when the driver uses a passenger's cell phone while driving the vehicle.

According to an embodiment herein, the anti-texting application does not disable the keypad of the cell phone when the driver is operating the cell phone in a safe manner. For example, speaking over a call using voice command options or by using head phones or the cell phone is either seated on the driver's lap other safe mechanisms that does not distract the driver concentration while driving the vehicle.

According to an embodiment herein, the anti-texting system disables the keypad of various applications in multiple cell phones that are bought near to driver seat by using specific bandwidths for each cell phone. According tone embodiment herein, the system disables the multiple separate cell phones that are used by the driver for text messaging while driving the vehicle.

According to an embodiment herein, multiple Bluetooth transmitters have corresponding receivers in the cell phone. Accordingly when the driver uses multiple cell phones, the Bluetooth transmitters detect and disable the phones when the driver uses them while operating the vehicle.

According to an embodiment herein, the Bluetooth transmitters are original equipment installed in a car by a specialist or by car dealer while manufacturing the car. The Bluetooth transmitters are combined with the anti-texting application and cannot be disabled by the vehicle driver.

According to an embodiment herein the anti-texting system detects the facial expressions of the driver and sends physical alarms to the driver based on the detected facial expressions. According to an embodiment herein, the face recognition module recognizes the expressions and triggers an alarm in the vehicle when the driver feels drowsy.

According to one embodiment herein, the anti-texting application analyse the behaviour characteristics or patterns of the driver and further creates a profile for the driver in a driver mode box. The driver mode box is configured to get updates from anti-texting server and implements the updated rules in real time road scenarios. According to an embodiment herein, a new rule is updated in the anti-texting server to disable the keypad interface of a cell phone when the driver or a person in the driver seat tries to browse or surf the internet while driving the vehicle. Further, anti-texting application in all cell phones gets an update of disabling the keypad interface when the driver or person in the driver seat tries to browse or surf the internet while driving the vehicle.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments, which as a matter of language might be said to fall there between.

What is claimed is:

1. A system for preventing texting and making calls by a driver of a vehicle during a vehicle driving condition, the system comprising:
    a sensor module for detecting a vehicle running condition, wherein the sensor module comprises:
    an ignition detection module configured to detect a drive condition of the vehicle by using motion sensors and speed sensors or key position sensors;
    an alcohol tester module configured to analyse a breathing of the driver to detect a drunken condition of the driver;
    a face detection module configured to detects a facial expression of the driver by using an imaging sensor; and
    a gesture recognition module configured to detect hand/head gestures of the driver to send the analyzed data to a processing module to output a disable signal;
    a Bluetooth transmitter mounted on a windshield or dash board of a vehicle for creating a safe life zone or green zone around a driver seat; and
a Bluetooth receiver;
    wherein the Bluetooth transmitter sends a disable signal to the Bluetooth receiver to prevent texting operation or making calls, when the driver of the vehicle operates a mobile communication device for texting or messaging or initiating a call while driving a vehicle based on a sensor output, and wherein the Bluetooth transmitter is configured to disable texting operation or a call initiating operation in the mobile communication used by the driver, even when the driver uses the mobile communication device of the passengers for texting operation or making calls, and wherein the Bluetooth transmitters are combined with the anti-texting application and wherein the anti-texting application is not disabled by the vehicle driver, and wherein the anti-texting application provides special button to access the texting feature in the cell phone while driving the vehicle for a pre-set count in a month or during an emergency condition, and wherein the anti-texting application analyses the behavior characteristics or patterns of the driver and further creates a profile for the driver in a driver mode box, wherein the driver mode box is configured to get updates from anti-texting server and implements the updated rules in real time road scenarios.

2. The system according to claim 1, wherein the imaging sensor judges that the driver of a vehicle is engaged in texting a message or establishing call or browsing on internet using a mobile communication device while driving the vehicle.

3. The system according to claim 1, wherein the Bluetooth receiver is placed inside a mobile communication device of the driver.

4. The system according to claim 1, wherein the Bluetooth receiver is placed outside the mobile communication device of the driver.

5. The system according to claim 1, wherein the Blue tooth receiver transmits a disable signal to the mobile communication device of the driver to disable a key board interface to disable a texting operation.

6. The system according to claim 1, wherein the Bluetooth transmitter is configured to send the disable signal to the Bluetooth receiver to disable the texting operation or making calls, when the mobile communication device of the driver is operated by the driver of the vehicle or when the mobile communication device of the driver is held close to ear of the driver while driving a vehicle.

7. The system according to claim 1, wherein the Bluetooth transmitter is configured to disable texting operation or a call initiating operation m the mobile communication of the driver, while allowing an operation of the mobile communication device by passengers in the vehicle.

8. The system according to claim 1, wherein said system allows the driver to make emergency calls to designated authorities.

9. A method for preventing texting and making calls by driver of vehicle during a vehicle driving condition, the method comprising steps of:
    detecting a driver condition and vehicle condition using a sensor module;
    detecting a drive condition of the vehicle by using motion sensors and speed sensors or key position sensors in an ignition detection module;
    analyzing a breathing of the driver to detect a drunken condition of the driver with an alcohol tester module;
    detecting a facial expression of the driver by using an imaging sensor face detection module; and
    detecting and analyzing hand/head gestures of the driver with a gesture recognition module to send an analyzed data to a processing module to output a disable signal;
    activating a Bluetooth transmitter positioned on a vehicle to output a disable signal based on output of the sensor module; and
    receiving the disable signal from the Bluetooth transmitter by a Bluetooth receiver to disable a texting operation or a call initiating operation or call communication operation in a mobile communication device of a driver;
    wherein the Bluetooth transmitter sends a disable signal to the Bluetooth receiver to prevent texting operation or making calls, when the driver of the vehicle operates a mobile communication device for texting or messaging or initiating a call while driving a vehicle based on a sensor output, and wherein the Bluetooth transmitter is configured to disable texting operation or a call initiating operation in the mobile communication used by the driver, even when the driver uses the mobile communication device of the passengers for texting operation or making calls, and wherein the Bluetooth transmitter is combined with the anti-texting application and wherein the anti-texting application is not disabled by the vehicle driver, and wherein the anti-texting application provides special button to access the texting feature in the cell phone while driving the vehicle for a pre-set count in a month or during an emergency condition, and wherein the anti-texting application analyses the behavior characteristics or patterns of the driver and further creates a profile for the driver in a driver mode box, and wherein the driver mode box is configured to get updates from anti-texting server and implements the updated rules in real time road scenarios.

10. The method according to claim 9, wherein the imaging sensor judges that the driver of a vehicle is engaged in texting a message or establishing call using a mobile communication device while driving the vehicle.

11. The method according to claim 9, wherein the Bluetooth receiver is placed inside a mobile communication device of the driver.

12. The method according to claim 9, wherein the Bluetooth receiver is placed outside the mobile communication device of the driver.

13. The method according to claim 9, wherein the Blue tooth receiver transmits a disable signal to the mobile communication device of the driver to disable a key board interface to disable a texting operation.

14. The method according to claim 9, wherein the Bluetooth transmitter is configured to send the disable signal to the Bluetooth receiver to disable the texting operation or making calls, when the mobile communication device of the driver is operated by the driver of the vehicle or when the mobile communication device of the driver is held close to ear of the driver while driving a vehicle.

15. The method according to claim 9, wherein the Bluetooth transmitter is configured to disable texting operation or a call initiating operation in the mobile communication of the driver, while allowing an operation of the mobile communication device by passengers in the vehicle.

* * * * *